(12) United States Patent
Gramiccioni et al.

(10) Patent No.: US 9,833,810 B2
(45) Date of Patent: Dec. 5, 2017

(54) APPARATUS AND PROCESS FOR FACE PAINTING SUBSTRATES WITH PGM AND BASE METAL SOLUTIONS

(71) Applicant: BASF Corporation, Florham Park, NJ (US)

(72) Inventors: Gary A. Gramiccioni, Madison, AL (US); Kenneth R. Brown, Athens, AL (US); Andreas Richard Munding, Madison, AL (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/341,228

(22) Filed: Jul. 25, 2014

(65) Prior Publication Data

US 2016/0023237 A1 Jan. 28, 2016

(51) Int. Cl.
| | | |
|---|---|---|
| *B05D 1/28* | (2006.01) | |
| *B05C 1/00* | (2006.01) | |
| *B05C 11/10* | (2006.01) | |
| *B01J 37/02* | (2006.01) | |
| *B01J 33/00* | (2006.01) | |
| *B05C 1/08* | (2006.01) | |
| *B05C 1/02* | (2006.01) | |

(52) U.S. Cl.
CPC ............. *B05D 1/28* (2013.01); *B05C 1/00* (2013.01); *B05C 1/027* (2013.01); *B05C 1/0813* (2013.01); *B05C 11/101* (2013.01); *B05C 11/1002* (2013.01); *B01J 33/00* (2013.01); *B01J 37/02* (2013.01); *B01J 37/0201* (2013.01); *B01J 37/0215* (2013.01); *B01J 37/0234* (2013.01); *B05C 1/022* (2013.01); *B05C 1/0873* (2013.01)

(58) Field of Classification Search
CPC ....... B05C 1/022; B05C 1/027; B05C 1/0873; B05C 11/101; B05C 1/0813; B05C 1/00; B01J 33/00; B01J 37/02; B01J 37/0201; B01J 37/0215; B01J 37/0234; B05D 1/28; B29C 65/524; B29C 65/526
USPC ....... 118/244, 259, 260, 263, 694, 708, 712, 118/680, 600, 689; 427/429, 10
See application file for complete search history.

(56) References Cited

U.S. PATENT DOCUMENTS

| | | | | |
|---|---|---|---|---|
| 3,250,244 | A * | 5/1966 | Reinhart ................ | B29D 30/52 118/239 |
| 3,340,090 | A * | 9/1967 | Nordeman, Jr. ....... | D21H 5/003 118/602 |
| 4,621,071 | A | 11/1986 | Blanchard et al. | |
| 4,905,625 | A * | 3/1990 | Funke .................... | A63C 11/08 118/200 |
| 4,986,871 | A * | 1/1991 | Leslie .................. | B29D 24/004 156/197 |

(Continued)

FOREIGN PATENT DOCUMENTS

| | | |
|---|---|---|
| JP | 10-272406 | * 10/1998 |
| WO | WO-97/48500 | 12/1997 |

*Primary Examiner* — Laura Edwards
(74) *Attorney, Agent, or Firm* — Womble Bond Dickinson (US) LLP (57) ABSTRACT

The principles and embodiments of the present invention relate generally to systems and methods for applying a catalytic coating to the outwardly facing edges of the cell walls of a catalytic substrate to reduce the amount of soot that accumulates at the entrances of the substrate cells that can increase back pressure and reduce the flow of exhaust gases through the substrate.

17 Claims, 6 Drawing Sheets

(56) References Cited

U.S. PATENT DOCUMENTS

| | | | | |
|---|---|---|---|---|
| 5,466,291 | A | * | 11/1995 | DiRico .................. B05C 1/083 118/203 |
| 5,683,512 | A | * | 11/1997 | Mailander ............. B05C 1/0821 101/247 |
| 5,712,489 | A | * | 1/1998 | Elvidge .................. B65H 26/02 118/663 |
| 6,051,069 | A | * | 4/2000 | Schultz ............... B05B 13/0221 118/239 |
| 7,524,465 | B2 | | 4/2009 | Kumar et al. |
| 8,691,724 | B2 | | 4/2014 | Simon, III et al. |
| 2002/0129764 | A1 | * | 9/2002 | Jacobson ................. B05C 1/02 118/261 |
| 2011/0014101 | A1 | | 1/2011 | Suzuki et al. |

* cited by examiner

APPARATUS AND PROCESS FOR FACE PAINTING SUBSTRATES WITH PGM AND BASE METAL SOLUTIONS

TECHNICAL FIELD

Principles and embodiments of the present invention relate generally to systems and methods of applying a catalytic coating to one or more faces of a catalytic substrate.

BACKGROUND

A monolithic honeycomb substrate will typically have an inlet end and an outlet end, with multiple mutually adjoining cells extending along the length of the body from the inlet end to the outlet end. These honeycomb substrates typically have from about 100 to 600 cells-per-square-inch (cpsi), but may have densities range from 10 cpsi to 1200 cpsi. Cells having round, square, triangular, or hexagonal cell shapes are known.

The open frontal area may comprise 50% to 85% of the surface area, and the cell wall thickness may be from 0.5 to 10 mils, where 1 mil is 0.001 inches. The cells also may be separated from one another by walls with a thickness in the range of about 0.5 mil to about 60 mils (0.012 mm to 1.5 mm). In some cases the open frontal area may be as much as 91% for a 600 cpsi substrate with 2 mil cell wall thickness.

The cell walls of the substrate may be porous or non-porous, smooth or rough. For porous walls, an average wall pore diameter may be from about 0.1 to about 100 microns, and wall porosity may typically range between about 10-85%.

Under various operating conditions, carbon deposits (e.g., soot, coke) may accumulate on the leading edges of the cell walls. Over time this build-up of soot and coke can reduce the size of the cell openings and the overall open frontal area. This reduction in opening size can lead in turn to increased back pressure and lower gas flow through the catalytic substrates.

SUMMARY

Various embodiments are listed below. It will be understood that the embodiments listed below may be combined not only as listed below, but in other suitable combinations in accordance with the scope of the invention.

Principles and embodiments relate to a solution to the described problems by providing surface coatings that reduce or eliminate the amount of soot and coke deposits at the cell openings, and the resulting amount of clogging of the substrate cells.

Principles and embodiments relate to a system and process that coats the outwardly-facing edges of the walls forming a monolithic catalytic substrate with a coating liquid comprising a solution and/or slurry containing precious and/or base metals by transferring the solution or slurry from an absorbent applicator to the face of the monolithic catalytic substrate comprising the leading edges of the cell walls.

Embodiments of the present invention relate to an apparatus that can apply a very narrow but significant facial increase in deposited catalytic metal concentration (e.g., platinum group metals) to the inlet and/or outlet face of a monolithic catalytic substrate.

Principles and embodiments of the present invention relate to a system for depositing a face coating on a monolithic catalytic substrate comprising an in-feed system, an out-feed system, at least one conveyor motor operatively associated with the in-feed system and/or out-feed system, which drives the in-feed system and out-feed system at a specified speed, a motor controller in electrical communication with the at least one conveyor motor that controls the specified feed speed produced by the at least one conveyor motor, a coating liquid applicator positioned between the in-feed system and out-feed system, wherein the coating liquid applicator comprises an inside core and an outside nap, and a coating liquid trough positioned below the coating liquid applicator that is configured and dimensioned to receive the full length of the coating liquid applicator within the coating liquid trough and retains a coating liquid, and wherein the coating fluid trough is vertically positioned so that the nap of the coating roller is at least partially submerged within the coating liquid.

In various embodiments, the face coating system further comprises a coating liquid applicator motor operatively associated with the coating liquid applicator, which drives the coating liquid applicator at a specified rotational speed.

In various embodiments, the face coating system further comprises a clutch connected in between and operatively associated with the coating liquid applicator motor and coating liquid applicator, and wherein the motor controller is in electrical communication with the coating liquid applicator motor and controls the specified rotational speed produced by the coating liquid applicator motor.

In various embodiments, the face coating system further comprises a coating liquid delivery system that comprises a coating liquid reservoir and a coating liquid pump, wherein the coating liquid pump is connected to and in fluid communication with the coating liquid reservoir through a pump conduit, and the coating liquid pump is connected to and in fluid communication with the coating liquid trough through a delivery conduit, and wherein the coating liquid reservoir is connected to and in fluid communication with the coating liquid trough through a recovery conduit, so that the coating liquid trough and coating liquid reservoir may maintain a predetermined level of coating liquid in the coating liquid trough.

In various embodiments, the face coating system further comprises a liquid quantity sensor operatively associated with the coating liquid trough and in electrical communication with a controller that receives an electrical signal from the liquid quantity sensor and determines whether to activate the coating liquid pump to deliver additional coating liquid to maintain the predetermined liquid level in the coating liquid trough.

In various embodiments, the liquid quantity sensor is a high dynamic range scale operatively associated with the coating liquid trough that determines the amount of coating liquid present in the trough, and signals the coating liquid pump to deliver additional coating liquid to the coating liquid trough when the measured liquid weight falls below a predetermined amount.

In various embodiments, the liquid quantity sensor is a liquid level sensor that determines the height of coating liquid present in the coating liquid trough, and signals the coating liquid pump to deliver additional coating liquid to the coating liquid trough when the measured liquid height falls below a predetermined level.

In various embodiments, the face coating system further comprises a height-adjustment system operatively associated with the coating liquid applicator, which provides vertical positioning control, so the coating liquid applicator can be positioned a predetermined height above the horizontal plane of the in-feed and out-feed systems, and a coating liquid concentration sensor operatively associated with the coating liquid deliver system, which determines the amount of active coating material in the coating liquid.

In various embodiments, the face coating system further comprises a light source, a light sensor, and one or more light beams that follow a path from the light source to the light sensor that crosses the coating liquid applicator.

In various embodiments, the light path is above the horizontal plane of the in-feed and out-feed conveyors and a predetermined height below the level of the nap of the coating liquid applicator, so the coating liquid applicator initially blocks the one or more light beams.

In various embodiments, the one or more light beams crossing the nap of the coating liquid applicator become unblocked when the height of the nap is reduced by a predetermined amount, and a light beam below the predetermined height received by the light sensor generates an alert that the coating roller nap is no longer of sufficient height to provide an intended amount of coating liquid to a monolithic catalytic substrate.

In various embodiments, the face coating system further comprises a height-adjustment system operatively associated with the coating liquid applicator, which provides vertical positioning control, so the coating liquid applicator can be positioned a predetermined height above the horizontal plane of the in-feed and out-feed systems, and a computer in electronic communication with the height-adjustment system and the light sensor, wherein the computer is configured to receive electronic signals from the light sensor indicating the height of the coating liquid applicator above the horizontal plane of the in-feed and out-feed systems, and to send electronic signals to the height-adjustment system to change the vertical positioning of the coating liquid applicator.

Principles and embodiments of the present invention also relate to a method of coating a monolithic catalytic substrate comprising providing a coating liquid applicator, applying a substrate coating liquid to the coating liquid applicator, supporting a monolithic catalytic substrate on an in-feed system driven by a conveyor motor that imparts a direction of motion at a predetermined speed to the monolithic catalytic substrate, passing the monolithic catalytic substrate across the coating liquid applicator at the predetermined speed, so an amount of coating liquid is transferred from the coating liquid applicator to a face of the monolithic catalytic substrate that comes in contact with the coating liquid applicator, and detecting whether a light beam is blocked by the coating liquid applicator, and adjusting the coating liquid applicator height in response to the detection of an unblocked light beam.

In various embodiments, the method of coating a monolithic catalytic substrate further comprises providing a coating liquid trough, containing the substrate coating liquid in a coating liquid trough, wherein the substrate coating liquid becomes applied to the coating liquid applicator by placing the coating liquid applicator at least partially in contact with the coating liquid within the coating liquid trough.

In various embodiments, the method of coating a monolithic catalytic substrate further comprises monitoring the quantity of coating liquid in the coating liquid trough with a coating liquid sensor, determining if the quantity of coating liquid in the coating liquid trough is below and intended amount, and supplying additional coating liquid to the coating liquid trough to reestablish the intended quantity of coating liquid in the coating liquid trough.

In various embodiments, the method of coating a monolithic catalytic substrate further comprises receiving the monolithic catalytic substrate on an out-feed system that supports the monolithic catalytic substrate after it has passed across the coating liquid applicator.

In various embodiments, the method of coating a monolithic catalytic substrate further comprises adjusting the pressure between the coating liquid applicator and the a monolithic catalytic substrate, so that a predetermined amount of coating liquid is transferred from the coating liquid applicator to the a monolithic catalytic substrate.

In various embodiments, the pressure applied between the coating liquid applicator and the monolithic catalytic substrate is adjusted by applying a pressure to a face of the monolithic catalytic substrate opposite the face in contact with the coating liquid applicator, where the pressure on the opposite face of the catalytic substrate is applied by pressure-assist rollers.

In various embodiments, the method of coating a monolithic catalytic substrate further comprises monitoring the height of the coating liquid applicator above a horizontal plane of the in-feed system, determining if the coating liquid applicator is not an intended height above the horizontal plane of the in-feed system, and adjusting the height of the coating liquid applicator to be at an intended height above the horizontal plane of the in-feed system.

In various embodiments, the method of coating a monolithic catalytic substrate further comprises increasing the amount of coating liquid in the coating liquid trough sufficient to compensate for the adjusted height of the coating liquid applicator.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

The principles and embodiments of the present invention relate generally to systems and methods for applying a catalytic coating to the outwardly facing edges of the cell walls of a catalytic substrate to reduce the amount of soot that accumulates at the entrances of the substrate cells that can increase back pressure and reduce the flow of exhaust gases through the substrate.

In various embodiments, the soot that would otherwise accumulate at the cell openings of a catalytic substrate may be oxidized by a face coating of catalytic material, and maintain the flow of exhaust gases through the substrate by reducing, delaying, or preventing an increase back pressure.

Principles and embodiments relate to a system that coats the outwardly-facing edges of the walls forming a monolithic catalytic substrate with a catalytic material.

In the various embodiments, the monolithic catalytic substrate may also be referred to as a catalytic substrate or a substrate.

Embodiments of the system coat a monolithic catalytic substrate by absorbing a coating liquid comprising a soluble catalytic precursor and/or catalytic slurry material on an applicator, and then bringing the impregnated applicator into contact with a face of a monolithic catalytic substrate comprising the exposed edges of the cell walls.

In one or more embodiments, the soluble catalytic precursor and/or catalytic slurry material may comprise a platinum group metal including, platinum, palladium, rhodium, ruthenium, osmium, and iridium, or combinations thereof.

Principles and embodiments of the present invention also relate to controlling the amount of catalytic material deposited on the exposed face of the substrate and the distance into which the coating suffuses along the internal walls of the catalytic substrate by adjusting the processing and system parameters.

Principles and embodiments of the present invention also relate to balancing the rate the solution or slurry is absorbed onto a substrate surface with the rate the solution drains from the applicator along with the surface velocity and pressure applied between the applicator and face of a monolithic catalytic substrate.

In various embodiments, the coating applicator may have a cylindrical shape with an absorbent material of a predetermined thickness around the outside diameter and a shaft onto which the applicator may be mounted or around which the applicator may rotate. In various embodiments, bearings or bushings may be operatively associated with the core and a shaft, so the core of the applicator may freely rotate on the shaft. In various embodiments, the applicator may be mounted (e.g., push fit) on a core that free rotates in bearings or bushings mounted to a frame.

In various embodiments, the pressure between a substrate and an applicator may be regulated and/or assisted by one or more pressure-assist rollers bearing on the opposite face of the substrate as it passes over the applicator. A pressure assist roller may be mounted to the frame of the in-feed system and/or out-feed system, and comprise one or more rollers positioned above the applicator a distance approximately equal to the height of a substrate passing across the applicator to prevent the substrate from being lifted by the applicator. The pressure assist roller may maintain an intended amount of force between the substrate and the applicator that may be greater than the pressure the weight of the substrate alone could generate. The height of the pressure assist roller may be adjustable, and may be operatively associated with an adjustment mechanism and servo motor to adjust the roller height in response to signals received from a controller. The controller may be computer controlled and/or interfaced with a computer for automated or semi-automated adjustment of the one or more pressure assist roller(s).

In various embodiments, the speed of the catalytic substrate and surface velocity of the applicator is determined by the linear speed of the in-feed conveyor, and the pressure between the substrate and applicator is determined by the applicator height above the plane of the in-feed conveyor and the weight of the catalytic substrate.

In various embodiments, the height of the coating applicator may be raised or lowered to change the level of the nap exposed to the substrate.

In various embodiments of the invention, the height of the coating applicator above the plane of the in-feed system may be determined by passing at least one beam of light across the coating applicator.

In various embodiments, the light source may be a single transmitter, for example a laser, a laser diode, or light emitting diode (LED), and a single light sensor, for example a photodiode or phototransistor, positioned a specific height above the plane of the in-feed and out-feed conveyors, where the light source and light sensor are on the opposite sides of the conveyors.

In various embodiments, the height of the coating liquid applicator and pressure of the coating liquid applicator nap against the catalytic substrate face may be determined by detecting whether a light beam is blocked by the coating liquid applicator, and adjusting the coating liquid applicator height in response to the detection of an unblocked light beam to increase contact between the coating liquid applicator nap and catalytic substrate face. In various embodiments, a computer may receive the light signals from the light sensor and send signals to increase the applicator height until the signals from the light sensor are interrupted.

In various embodiments, the light source may be a vertical array of transmitters, for example lasers, laser diodes, or light emitting diodes, that provide a vertical curtain of parallel light beams, and the light sensor may be a vertical array of receivers, for example photodiodes or phototransistors that provide a vertical arrangement of light detectors to detect light from the transmitters.

When embodiments of the present invention are in operation the widest part of the substrates will often pass across the middle section of the coating liquid applicator, and thereby compact and/or abrade that portion of the applicator faster than the sections closer to either edge of the applicator. Because the middle section experiences more contact time with the substrates being coated, the middle portion, which gets the most use, will begin to fail first, resulting in a slowly widening band across the substrate that will have less coating material transferred to the substrate. This may occur due to less nap height and/or lower pressure between a worn portion of the applicator and the substrate, as well as possibly reduced liquid retention by the worn portion of the applicator.

In various embodiments, the one or more beams of light may be passed at an angle approximately through the middle of the roller. The beams of light may be detected by one or more light sensors on the opposite side of the roller.

Various exemplary embodiments of the invention are described in more detail with reference to the figures. It should be understood that these drawings only illustrate some of the embodiments, and do not represent the full scope of the present invention for which reference should be made to the accompanying claims.

Figure 1:
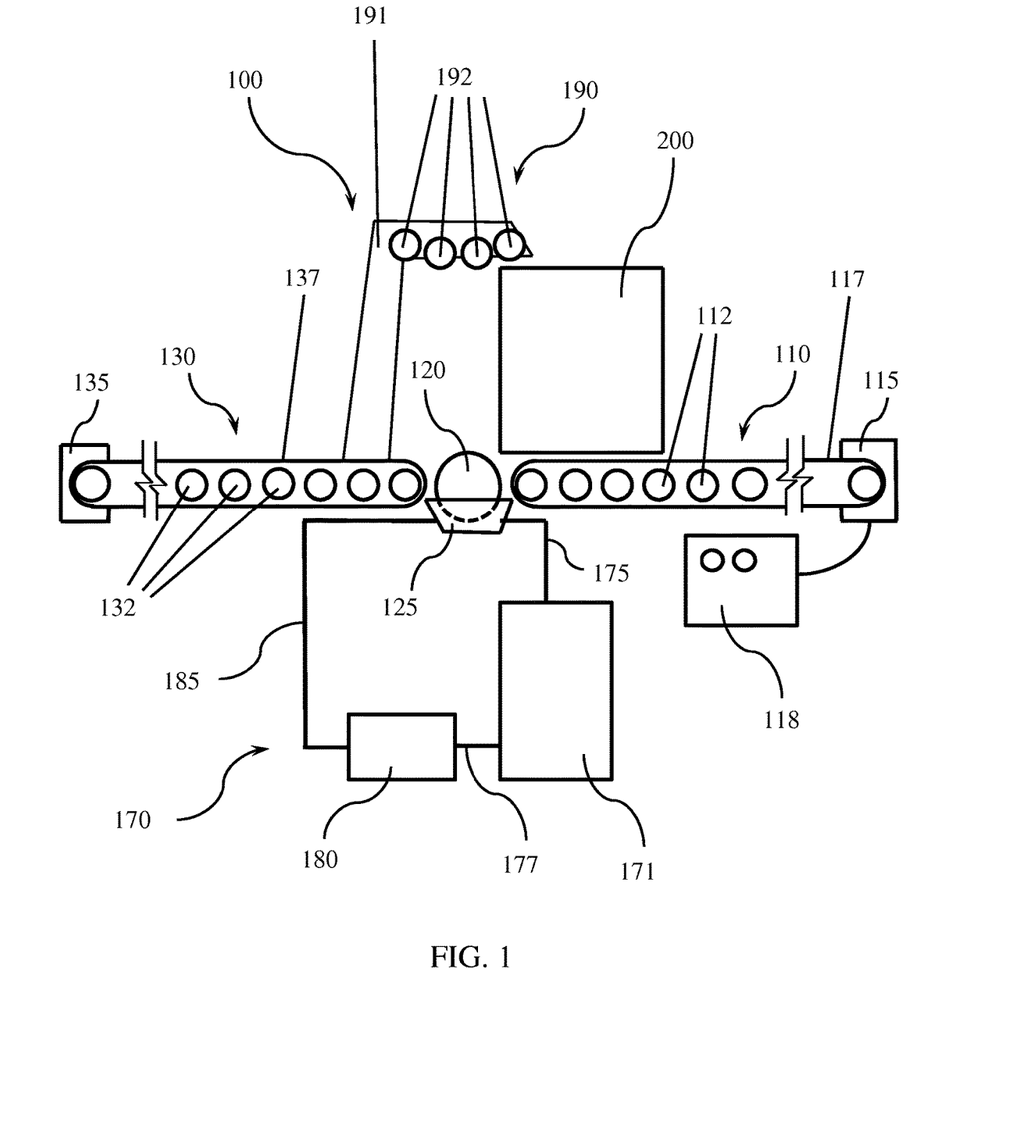
FIG. 1 illustrates a side view of an exemplary embodiment of the coating system.

FIG. 1 illustrates a side view of an exemplary embodiment of a coating system 100. A catalytic substrate 200 may be loaded into the system robotically or by hand by placing a face of the substrate to be coated onto the in-feed system 110.

In various embodiments, the in-feed system 110 may be a conveyor comprising a series of closely spaced rollers 112 driven by a conveyor motor 115 and drive chain through sprockets attached to each of the roller shafts (not shown), or a belt 117 looped around an arrangement of rollers with one of the rollers driven by a conveyor motor 115, where the motor can be a variable speed A/C or D/C electric motor and operatively associated controller 118.

In various embodiments, an out-feed system 130 receives the catalytic substrate after is has passed over the coating applicator 120. In various embodiments, the out-feed system may be a conveyor comprising a series of closely spaced rollers 132 that are freely rotating and are not driven by a motor. In various embodiments, in which the out-feed conveyor 130 is freely rotating, the in-feed system 110 regulates the velocity of the substrate across the applicator to the out-feed system.

In some embodiments, the out-feed system 130 may be a conveyor comprising a series of closely spaced rollers 132 driven by the same conveyor motor 115 as the in-feed system 110 and operatively associated with a drive chain through sprockets attached to each of the roller shafts (not shown). In some embodiments, the out-feed system 130 may be a conveyor comprising a series of closely spaced rollers 132 driven by a belt 137 looped around an arrangement of rollers with one of the rollers driven by a separate conveyor motor 135, where the motor can be a variable speed A/C or D/C electric motor and operatively associated controller 118.

In various embodiments, the rollers of the in-feed system may be mounted in and supported by a frame configured and dimensioned to receive a monolithic catalytic substrate. The frame may comprise rails along opposite sides of the rollers 112 to which the shaft(s) of the rollers may be operatively associated, for example with mounting holes, bearings or bushings. The frame may further comprise cross-members to provide rigidity, and adjustable upright supports to set the height of the in-feed system.

In various embodiments, the rollers 132 of the out-feed system may be mounted in and supported by a frame configured and dimensioned to receive a monolithic catalytic substrate. The frame may comprise rails along opposite sides of the rollers to which the shaft(s) of the rollers may be operatively associated, for example with mounting holes, bearings or bushings. The frame may further comprise cross-members to provide rigidity, and adjustable upright supports to set the height of the in-feed system. The in-feed system and out-feed system may be set to the same height, and configured and dimensioned to be operatively associated with other functional units (e.g., robots, scales, driers, staging areas). In various embodiments, the coating liquid trough 125 may be mounted to either the in-feed system 110, the out-feed system 130, or both with suitable brackets and/or hardware, as would be known in the art.

In one or more embodiments, the in-feed system 110 and out-feed system 130 may be mounted in the same frame with the coating liquid trough mounted to the frame between the in-feed and out-feed systems.

In one or more embodiments, where the in-feed system 110 and out-feed system 130 are both driven by a motor, the in-feed system 110 and out-feed system 130 should be synchronous and move at the same speed, so there is no discontinuity in the movement and/or velocity of the substrate as it passes from one conveyor to another. The substrate should have a uniform speed while it is in contact with the coating applicator 120. A delay in uptake by the out-feed conveyor may cause transfer of liquid from the applicator to at least a portion of the substrate to temporarily decrease, thereby producing an unevenly coated substrate face. Conversely, acceleration by the out-feed conveyor may cause transfer of liquid from the applicator to at least a portion of the substrate to temporarily increase, thereby producing an unevenly coated substrate face.

In various embodiments, the electric motor may be a servo motor, a brushless DC motor, or a stepper motor, along with the appropriate controller, as would be known in the art.

In one or more embodiments of the invention, the in-feed system 110 conveys the monolithic catalytic substrate at a specified velocity towards a coating applicator 120 that has absorbed an amount of coating liquid. The monolithic catalytic substrate may be in contact with the applicator for a specific time based on the substrate's velocity and size. In various embodiments, the monolithic catalytic substrate may be in contact with the applicator for between about 0.5 seconds and about 4 seconds, or alternatively between about 1 second and about 2 seconds, or alternatively between about 2 seconds and about 3 seconds, or for about 1.5 seconds.

In various embodiments, the coating applicator 120 may be a cylindrical roller comprising an absorbent nap and a core that supports the nap. The roller nap may be a foam, a porous rubber, a woven material, or a non-woven material that can absorb and retain a consistent amount of liquid.

In various embodiments, pressure assist system 190 may be mounted to a frame of the in-feed system 110 and/or out-feed system 130 by a support 191, and comprise one or more rollers 192 positioned above the applicator 120 a distance approximately equal to the height of a substrate 200 passing across the applicator 120 to prevent the substrate from being lifted by the applicator. The pressure assist roller(s) 192 may maintain an intended amount of downward force between the substrate and the applicator that may be greater than the pressure that the weight of the substrate alone would generate. In various embodiments, the pressure assist rollers may be rubber, foam rubber, or other elastomeric materials known in the art. The pressure assist rollers 192 may be operatively associated with tension springs to adjust the amount of downward force provided.

In various embodiments, the applicator 120 may be positioned in a coating fluid trough or tray 125 that contains the coating liquid comprising a soluble catalytic precursor and/or catalytic slurry material. The applicator may be at least partially submerged in the coating solution of soluble catalytic precursor and/or catalytic slurry material, so that the applicator nap may absorb a quantity of the coating solution of soluble catalytic precursor and/or catalytic slurry material.

In various embodiments, a coating liquid delivery system 170 may be operatively associated with the coating liquid trough 125, and comprise a suitable fluid pump 180, a coating liquid reservoir 171, an inlet conduit 177, a delivery conduit 185 and a return conduit 175. The inlet conduit 177 may be connected to and in fluid communication with the fluid pump 180 at a first end and the coating solution reservoir 171 at an opposite end. The delivery conduit 185 may be connected to and in fluid communication with the fluid pump 180 at a first end and the coating liquid trough 125 at an opposite end. The return conduit 175 may be connected to and in fluid communication with the coating liquid trough at a first end and with the coating liquid reservoir 171 at an opposite end.

In one or more embodiments, the coating liquid delivery system 170 may maintain the level of the coating liquid in the coating liquid trough 125 at a predetermined height, and supply an amount of coating solution with a known concentration, as well as function as a circulating system to provide a measure of agitation and mixing to the solution in the coating fluid trough 125. In various embodiments, the coating fluid may be pumped from the coating liquid reservoir 171 by a coating liquid pump 180 to the coating liquid trough 125.

In one or more embodiments, the coating liquid delivery system 170 may continuously circulate the coating liquid through the coating liquid trough to maintain a steady concentration and level of coating liquid in the coating liquid trough 125. A scale may be operatively associated with the coating liquid reservoir 171 to monitor the amount of coating liquid used over a period of time and/or for a quantity of catalytic substrates, where the quantity of catalytic substrates may be predetermined or counted during operation of the coating system 100. In various embodiments, the computer may receive weight values from the coating liquid trough scale and store the values over time to determine coating liquid usage and/or up-take trends over a number of catalytic substrates, which may be used for statistical analysis.

In various embodiments, a liquid quantity sensor operatively associated with the coating liquid trough 125 may determine if a sufficient amount of liquid is present in the coating liquid trough 125 to be applied to the applicator 120, where the liquid quantity sensor may be a liquid height sensor or a scale. In various embodiments, the liquid quantity sensor may determine if the quantity of coating liquid in the coating liquid trough is below an intended amount by height or weight of the coating liquid in the trough.

In various embodiments, the amount of coating liquid in the coating liquid trough may be determined by a liquid height sensor, which may be mounted to the coating liquid trough 125. The liquid height sensor may be electrically connected to and/or in electronic communication with a computer that is configured to receive electronic signals from the liquid height sensor, and determined the amount of coating liquid present in the trough 125. The computer may also be electrically connected to and/or in electronic communication with the fluid pump 180, and the computer may be configured to send electronic signals to the pump. The pump may be configured to transition between a pumping state and a non-pumping based on the particular electronic signal(s) communicated from the computer. In various embodiments, the liquid height sensor, fluid pump 180, and computer form a feed-back loop that operates to maintain the liquid level in the coating liquid trough 125 at a predetermined height.

In various embodiments, the amount of coating liquid in the coating liquid trough 125 may be determined by a scale operatively associated with the coating liquid trough 125, and which may be mounted to the coating liquid trough 125. The coating liquid trough scale may be electrically connected to and/or in electronic communication with a computer that is configured to receive electronic signals from the coating liquid trough scale, and determined the amount of coating liquid present in the trough 125 by weight. The computer may also be electrically connected to and/or in electronic communication with the fluid pump 180, and the computer may be configured to send electronic signals to the pump. The pump may be configured to transition between a pumping state and a non-pumping based on the particular electronic signal(s) communicated from the computer. In various embodiments, the coating liquid trough scale, fluid pump 180, and computer form a feed-back loop that operates to maintain the weight of coating liquid in the coating liquid trough 125 at a predetermined weight.

In one or more embodiments, a scale or height sensor may be operative associated with the coating liquid reservoir 171 to determine if the reservoir is running low and needs to be refilled. The scale or height sensor operative associated with the coating liquid reservoir 171 may be electrically connected to and/or in electronic communication with a computer that is configured to trigger an alarm if the coating system contains an insufficient amount of coating liquid, and/or place the coating system in an inoperative state to prevent improper coating of the substrates.

In various embodiments, a coating liquid concentration sensor may be operatively associated with the coating liquid deliver system to measure the amount of active coating material in the coating liquid. The coating liquid concentration sensor may measure the concentration of the coating liquid spectrophotometrically (e.g., FTIR, NIR, UV/Vis, etc.), colorometrically (e.g., Visible light), by turbidity-total suspended solids (e.g., light attenuation, light scattering), or solution density (e.g., refractive index). The coating liquid concentration sensor may be in electronic communication with a computer to calculate and store solution concentrations.

In various embodiments, the concentration of the coating solution may be between about 0.5% and about 5% by weight of platinum group metal, or alternatively, the coating solution may have a concentration of between about 1% and about 2% by weight of platinum group metal, or about 1.5% by weight of platinum group metal, where the platinum group metals include ruthenium, rhodium, palladium, osmium, iridium, and platinum.

In various embodiments, the coating solution comprises a precious metal catalyst selected from the group consisting of platinum, palladium, rhodium, and combinations thereof, which may be a soluble compound dissolved in a liquid carrier. The soluble platinum compound may be for example, chloroplatinic acid, platinum (IV) chloride, $K_2PtCl_4$, and platinic sulfates. The soluble rhodium compound may be for example, hydrated rhodium (III) chloride and rhodium sulfates. The soluble palladium compound may be for example, palladium (II) chloride, $K_2PdCl_4$, palladium nitrates, and palladium sulfates.

In various embodiments, the coating solution comprises a base metal catalyst selected from the group consisting of calcium, barium, strontium, cerium, cesium, copper, iron, nickel, cobalt, manganese, chromium, vanadium, and combinations thereof, which may be a soluble compound dissolved in a liquid carrier (e.g., $H_2O$).

In various embodiments, the slurry may comprise alumina, silica-alumina, zeolites, zirconia, titania, lanthana, and combinations thereof.

In various embodiments, the slurry may comprise oxides of calcium, barium, strontium, cerium, cesium, copper, iron, nickel, cobalt, manganese, chromium, vanadium, and combinations thereof.

Figure 2:
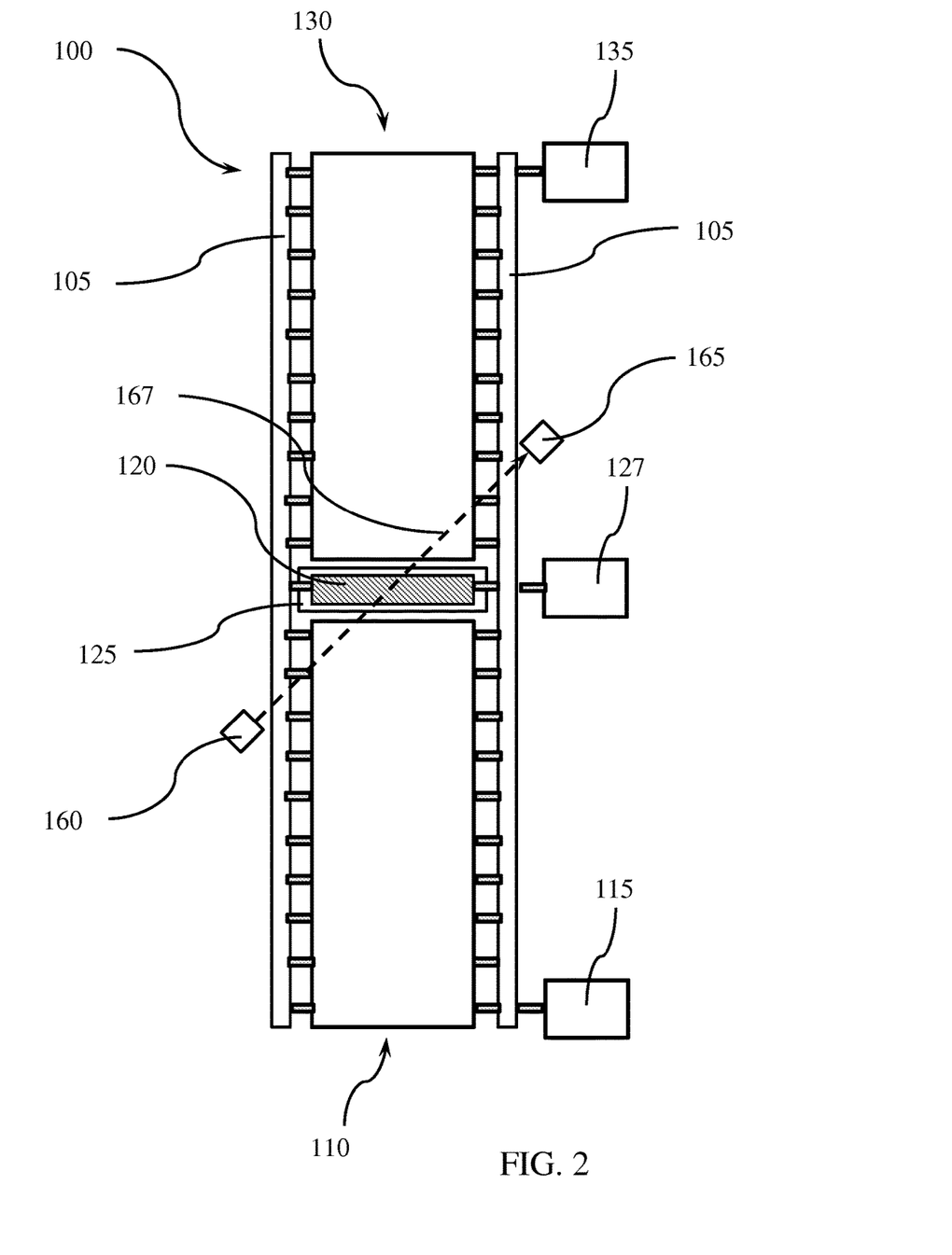
FIG. 2 illustrates a top view of an exemplary embodiment of the coating system.

FIG. 2 illustrates a top view of an exemplary embodiment of the coating system 100 in which an in-feed conveyor 110 is driven by an electric motor 115, and out-feed conveyor 130 is driven by a separate electric motor 135. The rotating applicator 120 is positioned between the in-feed conveyor 110 and out-feed conveyor 130, where there may be a minimal gap between the applicator 120 and the conveyors to provide consistent support to a substrate as it passes from one conveyor to another, and maintains consistent pressure against the applicator 120, while the coating solution is being applied.

In some embodiments, the rotating applicator 120 may be driven by a motor 127, so that it rotates at a specified speed, whereby the absorbent nap continuously comes into contact with a source of catalytic coating solution and remains in contact with the solution for a sufficient time to be absorbed.

In an embodiment, the electric motor 127 is coupled to and operatively associated with an applicator shaft through a clutch that allows slip between the motor and the rotating applicator 120. The clutch permits the rotational speed of the applicator to match the linear speed of the substrate as regulated by the in-feed conveyor to avoid impeding or accelerating the substrate while it is in contact with the applicator.

In one or more embodiments, the clutch allows the in-feed velocity of the substrate to control the application speed, thereby preventing excess or insufficient delivery of Pt to the substrate face.

In one or more embodiments, a light source 160 and light sensor 165 may be mounted to the coating system 100, and the light source 160 may project one or more beams of light across the liquid applicator 120 in a horizontal plane at or above the horizontal plane of the in-feed and/or out-feed systems to the light sensor 165 to detect if the applicator 120 extends above the plane of the in-feed and/or out-feed systems. In various embodiments, the nap of the applicator 120 will block the beam of light when the applicator 120 is at a proper height, and the applicator 120 will not block the beam of light from arriving at the light sensor 165 if the applicator is positioned too low or the nap has been compressed or worn down. In various embodiments, the light beam should pass diagonally across the center portion of the applicator 120.

Figure 3A:
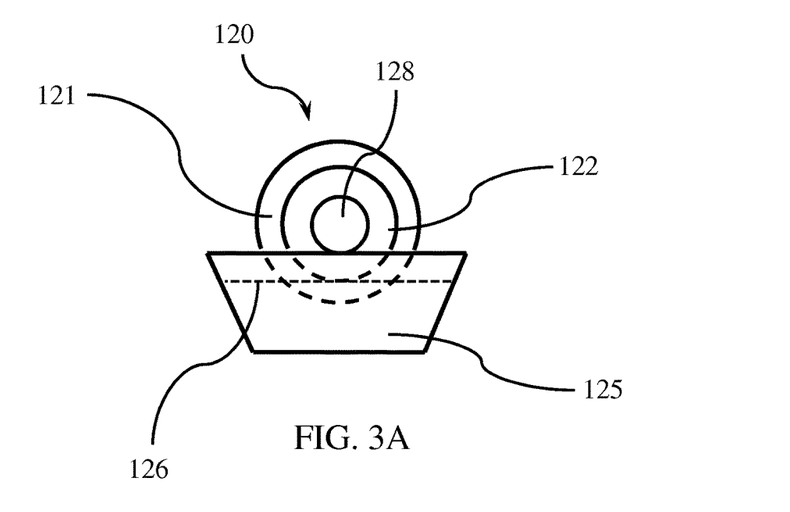
FIGS. 3A-B illustrate a an exemplary embodiment of a coating applicator and coating liquid trough.
Figure 3B:
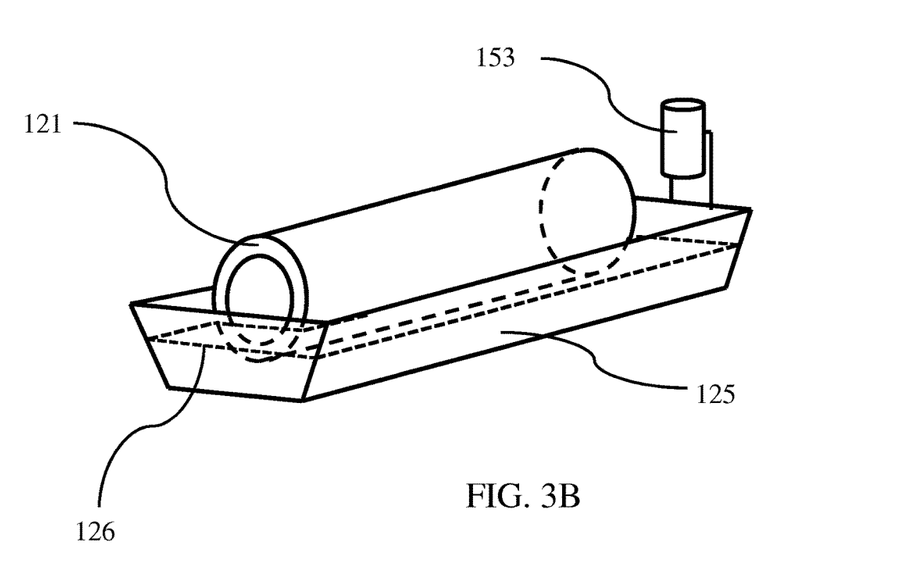

FIGS. 3A-3B illustrate a cylindrical applicator 120 comprising an absorbent nap 121 surrounding a core 122, which may be mounted to a shaft 128. The shaft 128 may be a solid cylinder, hollow cylinder, or a plurality of deflectable rods with sufficient strength to support at least a portion of the weight of a monolithic catalytic support 200, with or without additional downward pressure from one or more pressure-assist rollers bearing on the opposite face of the substrate as it passes over the applicator 120, without bending or otherwise deflecting.

In various embodiments, the applicator 120 is wider than the catalytic substrate to be coated. The applicator may be configured and dimensioned to fit into the same supporting structure (e.g., frame, vertical supports, etc.) as the rollers of the in-feed and/or out-feed system(s) 110,130. In a non-limiting example, the applicator may be an 18 inch wide roller, and the coating liquid trough 125 is configured and dimensioned to receive the roller.

In one or more embodiments, as shown in FIG. 3A, the applicator shaft 128 may be above the side wall of a coating liquid trough 125, while at least a portion of the applicator nap 121 is below a surface level 126 of a coating solution in the coating liquid trough 125.

In various embodiments, the height of the surface level 126 of the coating solution in the coating liquid trough 125 may be adjusted by changing the vertical position of a downward-opening weir gate and a sluice operatively connected to the coating liquid trough 125, where the weir gate and a sluice may control the amount of discharge from the coating liquid trough 125.

In various embodiments, the shaft 128 may be coupled to an electric motor that imparts a rotational speed to the shaft 128 and a mounted applicator 120. In various embodiments, during operation for example the rotation of the applicator 120 causes progressive sections of the nap 121 to continuously become submerged in a coating liquid.

FIG. 3B illustrates an exemplary embodiment of a cylindrical applicator fitting into a coating liquid trough 125 length-, width-, and depth-wise, so the applicator may evenly positioned in the trough 125 and evenly absorb the coating liquid. In various embodiments, a liquid level sensor 153 that determines the height of coating liquid present in the coating liquid trough may be affixed to and operatively associated with the trough 125.

FIGS. 4A-4D illustrate the progressive passage of a cylindrical catalytic monolith 200 from an in-feed system 110 over an applicator 120 to an out-fed system 130.

In one or more embodiments, the in-feed system 110 and out-feed system 130 provide an essentially horizontal surface in a horizontal plane that supports the weight of the monolithic catalytic substrate 200, so that it remains level, and the substrate has an essentially uniform pressure against the applicator as the substrate passes over the applicator.

Figure 4A:
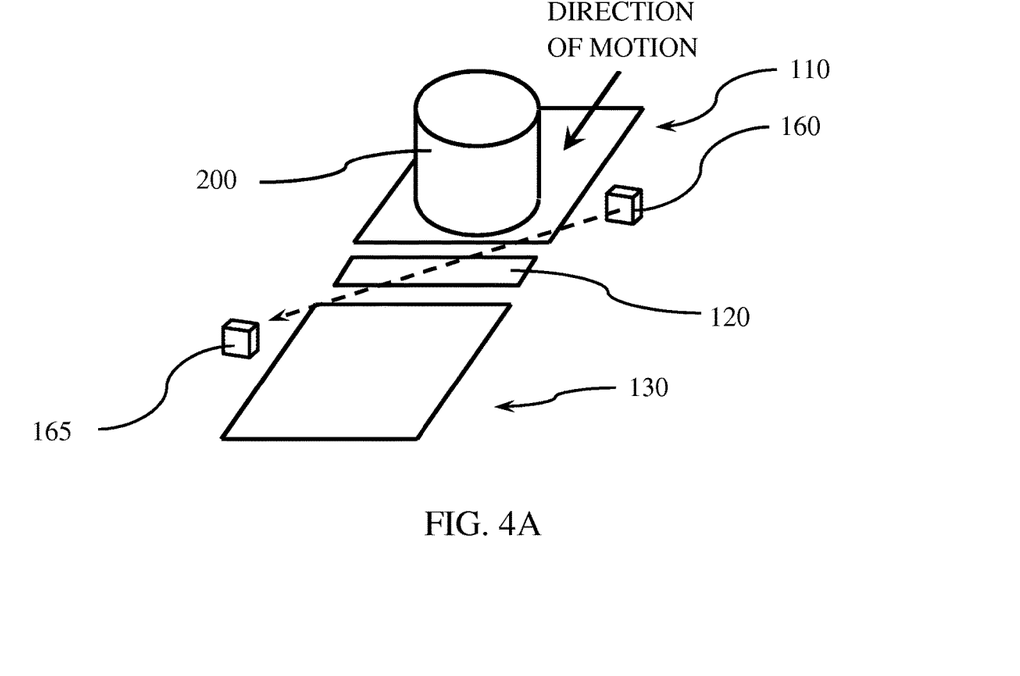
FIGS. 4A-4D illustrate an exemplary embodiment of a nap measurement assembly.

FIG. 4A illustrates a monolithic catalytic substrate 200 supported on an in-feed system 110 that imparts a horizontal velocity to the substrate in the direction of the applicator 120. The catalytic substrate may have a predetermined speed, as determined by the setting(s) of an electric motor, a motor controller, a computer, or a combination thereof. A coating liquid applicator 120 may be provided at one end of the in-feed system 110 for applying a coating liquid to the substrate 200. The monolithic catalytic substrate 200 may be presented to the coating liquid applicator 120 in a manner that assures uniformity of contact time and pressure between the substrate and the applicator.

In one or more embodiments, the substrate coating liquid may be applied to the coating liquid applicator 120 from a source of coating liquid, for example a coating liquid trough that has sufficient internal volume to contain enough coating liquid to at least wet the applicator 120. In various embodiments, the coating liquid applicator 120 will become saturated with the coating liquid as at least an absorbent portion of the applicator becomes submerged in the coating liquid.

Figure 4B:
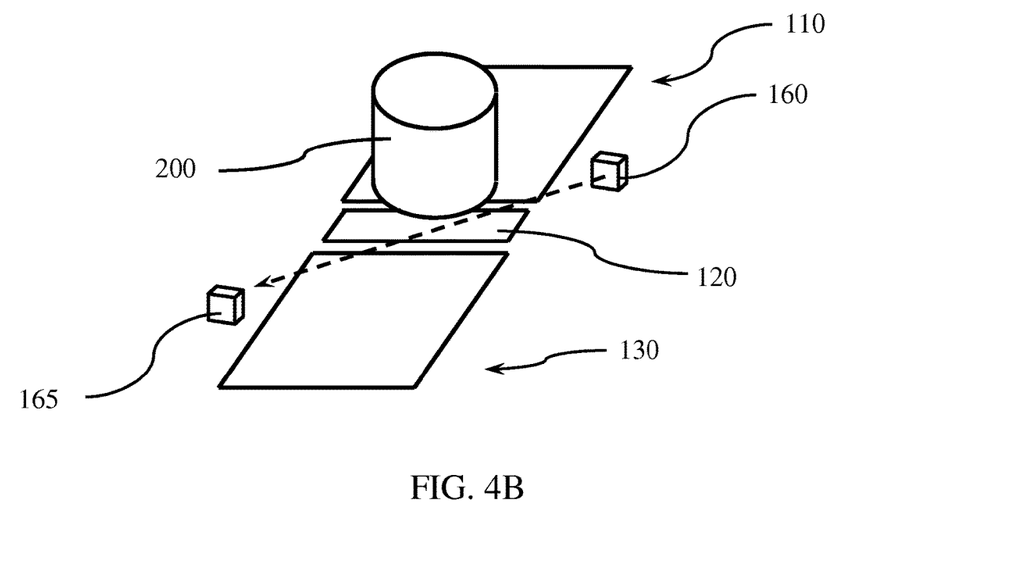

FIG. 4B illustrates a monolithic catalytic substrate 200 coming into contact with the coating liquid applicator 120, for example initially at a center portion of the applicator. The substrate coating liquid is applied to at least the portion of the substrate 200 that is in contact with the applicator.

Figure 4C:
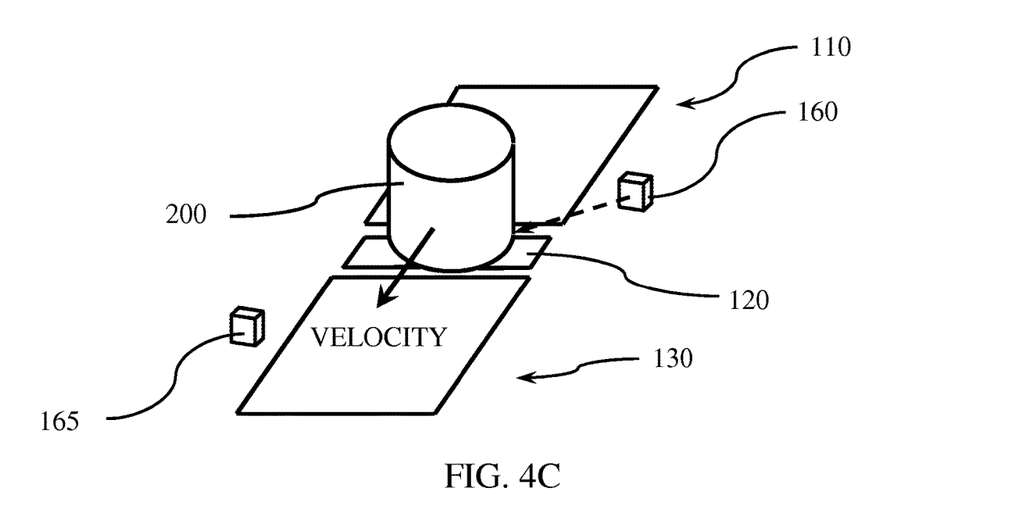

FIG. 4C illustrates the monolithic catalytic substrate 200 passing across the coating liquid applicator 120 at the horizontal speed established by the electric motor of the in-feed system 110, so an amount of coating liquid is transferred from the coating liquid applicator to a face of the monolithic catalytic substrate 200 in contact with the coating liquid applicator 120. As the substrate rolls over the applicator progressive portions of the substrate 200 come into contact with progressive portions of the applicator 120. In various embodiments, a clutch connected between a motor and the applicator allows the applicator to freely match the speed of the in-feed system 110 and substrate 200.

In one or more embodiments, the horizontal speed of the monolithic catalytic substrate across the coating liquid applicator may affect the amount of coating liquid transferred to the substrate, where for example a higher speed increases the amount of coating liquid transferred to the substrate. For example, an increase in horizontal speed reduces the time for the coating liquid to drain from the absorbent applicator.

In one or more embodiments, the coating liquid applicator 120 may be vertically adjustable, so the height that the applicator extends above the horizontal plane of the in-feed 110 and out-feed 130 systems may be increased or decreased. An increase in applicator height may be correlated with an increase in pressure between the coating liquid applicator 120 and the monolithic catalytic substrate 200, when the applicator and substrate are in contact. Similarly, a decrease in applicator height may be correlated with a decrease in pressure between the coating liquid applicator

120 and the monolithic catalytic substrate 200, when the applicator and substrate are in contact.

In various embodiments, the applicator height may be automated with a height adjustment system comprising a linear drive motor assembly and associated controller, or a hydraulic cylinder assembly, fluid supply (e.g., air, water, hydraulic fluid), a pump, and an associated controller. The controller may be computer controlled and/or interfaced with a computer for automated or semi-automated adjustment of the applicator height with the linear drive motor assembly or the hydraulic cylinder assembly to change the position of the applicator, for example in a vertical direction.

In various embodiments, the amount of pressure between the coating liquid applicator 120 and the monolithic catalytic substrate 200 may affect the amount of coating liquid transferred from the applicator to the substrate, and/or the maximum depth of penetration of the coating liquid into the cells of a monolithic catalytic substrate. The depth of migration of the coating liquid from the face of the substrate along the cell walls may be affected by the volume of coating liquid applied to the substrate face.

In various embodiments, the applicator 120 would be at least partially elevated, so as to expose the nap 121 evenly across the horizontal plane defined by the in-feed 110 and out-feed 130 rollers. In various embodiments, a catalytic substrate 200 passing over the elevated applicator would typically come into contact with the exposed nap 121 near the center of the applicator. Contact between the nap containing an amount of coating liquid would transfer at least a portion of the absorbed liquid from the applicator to the face of the substrate in contact with the applicator. In various embodiments, the maximum depth of penetration of the coating liquid into the cells of a monolithic catalytic substrate may be between about 1 mm and 2.5 mm, or alternatively about 80 mils (about 2 mm). The depth of penetration of the coating liquid into the cells should be uniform across the face of the substrate, for example with a variation of ≤0.5 mm, or ≤0.2 mm, or ≤0.1 mm.

Figure 4D:
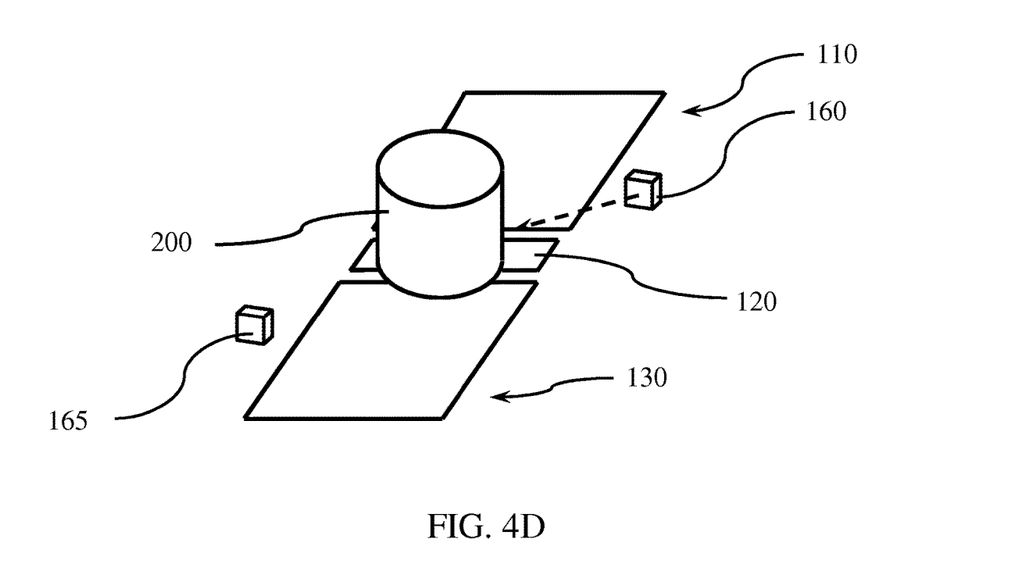

FIG. 4D illustrates an out-feed system 130 receiving the monolithic catalytic substrate 200 after at least a portion of the substrate has passed across the coating liquid applicator. The out-feed system 130 supports the weight of the monolithic catalytic substrate 200 as it is transferred from the applicator and in-feed system 110.

In various embodiments, the out-feed system is moving at the same horizontal velocity as was imparted to the substrate by the in-feed system, and accepts the substrate in an uninterrupted manner (e.g., without acceleration or deceleration).

In one or more embodiments, the light source 160 and light sensor 165 continuously monitor the height of the applicator, and may provide an alarm if it is determined that the applicator is too low.

In one or more embodiments, the out-feed system may be adjacent to other functional units such as a scale, a robot, a staging area, or a combination thereof.

In various embodiments, as the substrate passes over the applicator, and its weight is transferred from the in-feed system to the out-feed system as at least a portion of the substrate is in contact with the applicator 120. Movement of a substrate over the in-feed system, applicator, and out-feed system should be smooth, level, and even without changes in the substrates velocity or pressure against the applicator.

Figure 5A:
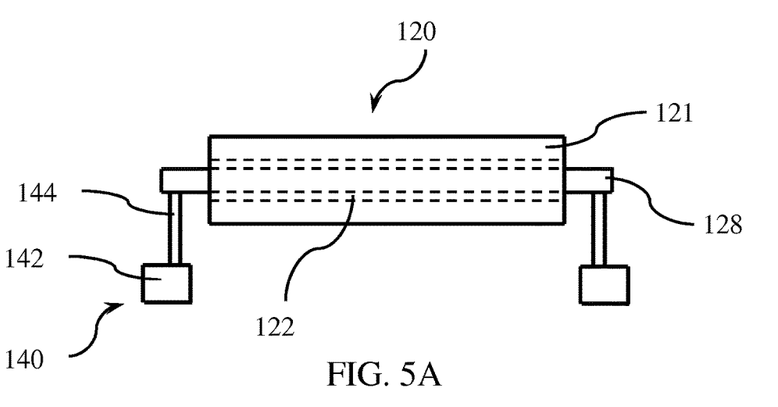
FIG. 5A illustrate an exemplary embodiment of a applicator height adjustment assembly.
Figure 5B:
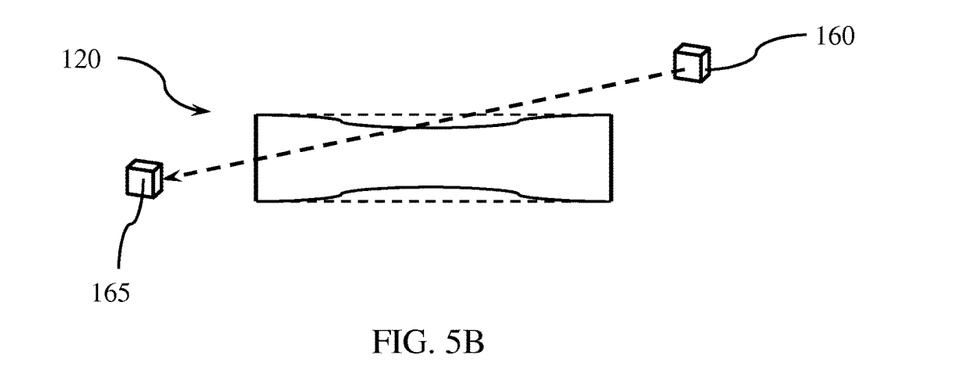
FIG. 5B illustrate an exemplary embodiment of a nap measurement assembly.

FIGS. 5A-5B illustrate a light beam initially blocked by the nap 121 of an applicator 120, which may become compressed or worn down over time.

FIG. 5A illustrates a cross-sectional view of an unused applicator 120 having an absorbent compressible nap 121 with a uniform thickness supported on a core 122, which may in turn be mounted on a shaft 128 with the nap 121 extending an initial height above the core 122. As the nap is compressed and/or worn down by repeated contact with substrate surfaces, the capacity of the applicator to absorb coating liquid may decrease, thereby reducing the amount of catalyst material deposited on the face of a substrate.

In one or more embodiments, the shaft 128 of the applicator 120 may be operatively associated with a height adjustment system 140 comprising a linear drive motor assembly or a hydraulic cylinder assembly to adjust the amount of the applicator and nap presented to a substrate above the horizontal plane of the in-feed system. In a non-limiting example, a linear motor 142 and feed screw 144 are operatively coupled to the shaft 128, so the applicator height may be automatically adjusted, and particularly for controlling the distance between the center of the applicator and the bottom of the catalytic substrate face.

FIG. 5B illustrates a cross-sectional view of an applicator 120 in which the compressible nap has been reduced from the initial height (shown as dashed lines) due to use and wear, so that a light beam from a light source 160 is no longer blocked by the nap, and may be detected by a light sensor 165 on the opposite side of the applicator. In various embodiments with a vertical array of light sources, the amount of height reduction may be followed over time as successively lower light beams can pass across the nap of the applicator. A reduction in height of the nap due to compression and/or wear may result in less coating liquid being absorbed by the applicator, and less contact and/or a lower pressure between the applicator and a substrate being coated, which may result in an uneven distribution of coating liquid across the surface of the catalytic substrate.

In one or more embodiments, the light source and/or light sensor may be electrically connected to and/or in electronic communication with a computer that is configured to receive the light sensor signal(s). In one or more embodiments, the computer may be configured to determine the height of the nap of the applicator, calculate the difference between the actual height and an intended height of the coating liquid applicator, and automatically raise the applicator height and/or trough height, and/or increase the height or weight of the coating solution in the coating liquid trough to compensate for the reduced nap height and/or absorbance.

In various embodiments, adjustments to the applicator height may be made by sending a signal to the controller for the linear drive motor assembly or the hydraulic cylinder assembly to raise the applicator until a particular light beam is blocked.

In one or more embodiments, the light beam passes approximately through a midpoint of the applicator 120, since this is the portion of the nap that would show compression and/or wear first. The detection of a light signal at the light sensor may indicate that the applicator requires replacement, and may trigger an audible and/or visual alarm.

In various embodiments, the monolithic catalytic substrate may be weighed before and after coating to determine the amount of catalytic material (e.g., platinum) deposited on the substrate.

In a non-limiting example, a surface concentration addition of 0.0025 g/in.$^2$ was applied to a monolithic catalytic substrate with a maximum depth of penetration of 2 mm into the part (=an addition of 54.8 g/ft$^3$ in the 2 mm zone of coating). The monolithic catalytic substrate was a ceramic substrate with no mantle overhang. The monolithic catalytic substrate may be circular with a 10.5 inch diameter.

Principles and embodiments of the present invention also relate to a method of applying a catalytic coating to one or more faces of a catalytic substrate, wherein the coating does not penetrate further than 2 mm into the interior of the substrate cells.

In an embodiment, a catalytic substrate may be obtained from a staging area and placed onto a first scale for an initial weighing, wherein the scale may comprise a computer and/or a memory configured to receive and store weight values obtained for a catalytic substrate, or the scale may be in electronic communication with a computer and/or a memory configured to receive and store weight values obtained for a catalytic substrate. The catalytic substrate may be removed from the staging area and placed on the scale by a robot as would be known in the art of manufacturing automation.

The scale(s) may be high dynamic range scales that can measure up to 40 kg. in 0.1 gram resolution, or up to 10 kg. in 0.1 gram resolution.

In one or more embodiments, the catalytic substrate may be transferred from the scale to the in-feed system of the face coating system, where the transfer may be accomplished by the same or a different robot as the one that placed the substrate on the scale. The substrate may be accelerated to an intended horizontal velocity by the in-feed system, and pass over a coating liquid applicator at the horizontal velocity, so the face of the substrate may be in contact with the applicator for a predetermined time. A coating liquid applicator may be wetted with a coating liquid, and transfer the coating liquid to the face of the substrate over the time the substrate face is in contact with the applicator. The catalytic substrate may be received by the out-feed system at the same horizontal velocity as the substrate was moving as the substrate passed over the applicator.

In one or more embodiments, a single robot may pick a substrate up from an in-staging area or a previous processing station in an automated process, move the substrate across the applicator at an intended height and/or applying an intended down pressure against the applicator, and place the coated substrate on an out-staging area, subsequent processing station in an automated process, or wet weight scale for measurement. The robot may be computer controlled and/or interfaced with a controller and/or computer for automated or semi-automated control and adjustment of the robot motion and positioning.

In one or more embodiments, the catalytic substrate may be weighed on a second scale to obtain an intermediate or wet weight after passing over the coating liquid applicator, wherein the scale may comprise a computer and/or a memory configured to receive and store weight values obtained for a catalytic substrate, or the scale may be in electronic communication with a computer and/or a memory configured to receive and store weight values obtained for a catalytic substrate. The catalytic substrate may be removed from the out-feed system and placed on the second scale by a robot, as would be known in the art of manufacturing automation.

In one or more embodiments, a scale may be operatively associated with the in-feed system to determine the dry weight of a catalytic substrate prior to the application of the coating liquid to the face of the substrate.

In one or more embodiments, a scale may be operatively associated with the out-feed system to determine the wet weight of a catalytic substrate after the application of the coating liquid to the face of the substrate.

In various embodiments, a scale may be operatively associated with each of the in-feed system and the out-feed system, and the scale operatively associated with the out-feed system may obtain the weight of the catalytic substrate after application of the face coating liquid, and may confirm that a measurable amount of coating liquid was applied to face of the catalytic substrate. A measure of the additional weight of the catalytic substrate after application of the face coating liquid may be calculated by the difference between the in-feed (dry) weight and out-feed (wet) weight measured by the respective scales.

In various embodiments, the weight values may be communicated from the in-feed system scale and the out-feed system scale to an associated computer to perform the calculations, and determine whether a correct amount of coating liquid was applied.

In various embodiments, the catalytic substrate may be inverted, so the substrate face opposite the face previously coated is oriented towards an in-feed system and coating liquid applicator. The inverted catalytic substrate may be placed on a second in-feed system for a second face coating system, or the catalytic substrate may be placed back onto the same in-feed system by robot, as would be known in the art of manufacturing automation to have the opposite face coated with a coating liquid.

In one or more embodiments, the inverted substrate may be accelerated to an intended horizontal velocity by the in-feed system, and pass over a coating liquid applicator at the horizontal velocity, so the face of the substrate may be in contact with the applicator for a predetermined time. A coating liquid applicator may be wetted with a coating liquid, and transfer the coating liquid to the face of the substrate over the time the substrate face is in contact with the applicator. The catalytic substrate may be received by the out-feed system at the same horizontal velocity as the substrate was moving as the substrate passed over the applicator. The catalytic substrate may be removed from the out-feed system and placed on another scale by a robot.

In one or more embodiments, the catalytic substrate may be placed on a scale to obtain a final weight with both faces coated. The catalytic substrate may be weighed on a second or a third scale to obtain a final wet weight after passing over the coating liquid applicator, wherein the scale may comprise a computer and/or a memory configured to receive and store weight values obtained for a catalytic substrate, or the scale may be in electronic communication with a computer and/or a memory configured to receive and store weight values obtained for a catalytic substrate. The catalytic substrate may be transferred from the scale to a staging area.

In various embodiments, the transfers between one or more of the functional units (e.g., scale, in-feed system, out-feed system, staging area(s)) may be done by a person instead of a robot.

Reference throughout this specification to "one embodiment," "certain embodiments," "one or more embodiments," "various embodiments," or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A system for depositing a face coating on a monolithic catalytic substrate comprising:
   an in-feed system configured to convey the monolithic catalytic substrate to a coating liquid applicator for deposition of a face coating;
   an out-feed system configured to receive the monolithic catalytic substrate from a coating liquid applicator and convey the monolithic catalytic substrate away from the coating liquid applicator;
   at least one conveyor motor operatively associated with the in-feed system and/or out-feed system, which drives the in-feed system and out-feed system at a specified speed;
   a motor controller in electrical communication with the at least one conveyor motor that controls a specified feed speed produced by the at least one conveyor motor;
   a coating liquid applicator positioned between the in-feed system and out-feed system, wherein the coating liquid applicator comprises an inside core and an outside nap having a nap height, the coating liquid applicator being operatively positioned to deposit a face coating on and within a monolithic catalytic substrate contacted therewith such that the face coating penetrates into cells of the monolithic catalytic substrate with a maximum depth of penetration of about 1 mm to about 2.5 mm;
   a coating liquid trough positioned below the coating liquid applicator that is configured and dimensioned to receive the full length of the coating liquid applicator within the coating liquid trough and retain a coating liquid, and wherein the coating liquid trough is vertically positioned so that the nap of the coating liquid applicator is at least partially submerged within the coating liquid;
   a coating liquid delivery system that comprises a coating liquid reservoir and a coating liquid pump, wherein the coating liquid pump is connected to and in fluid communication with the coating liquid reservoir through a pump conduit, and the coating liquid pump is connected to and in fluid communication with the coating liquid trough through a delivery conduit and wherein the coating liquid reservoir is connected to and in fluid communication with the coating liquid trough through a recovery conduit, so that the coating liquid trough and coating liquid reservoir may maintain a predetermined level of coating liquid in the coating liquid trough; and
   a liquid quantity sensor operatively associated with the coating liquid trough and in electrical communication with a controller that receives an electrical signal from the liquid quantity sensor and determines whether to activate the coating liquid pump to deliver additional coating liquid to maintain the predetermined liquid level in the coating liquid trough, wherein the liquid quantity sensor is a scale operatively associated with the coating liquid trough that determines an amount of coating liquid present in the trough, and signals the coating liquid pump to deliver additional coating liquid to the coating liquid trough when a measured liquid weight falls below a predetermined amount.

2. The system of claim 1, which further comprises a coating liquid applicator motor operatively associated with the coating liquid applicator, which drives the coating liquid applicator at a specified rotational speed.

3. The system of claim 2, which further comprises:
   a clutch connected in between and operatively associated with the coating liquid applicator motor and coating liquid applicator; and
   wherein the motor controller is in electrical communication with the coating liquid applicator motor and controls the specified rotational speed produced by the coating liquid applicator motor.

4. The system of claim 1, which further comprises:
   a height-adjustment system operatively associated with the coating liquid applicator, which provides vertical positioning control, so the coating liquid applicator can be positioned a predetermined height above the horizontal plane of the in-feed and out-feed systems; and
   a coating liquid concentration sensor operatively associated with the coating liquid delivery system, which determines an amount of active coating material in the coating liquid.

5. The system claim 1, wherein one or both of the in-feed system and the out-feed system comprise a plurality of spaced rollers positioned to support the weight of the monolithic catalytic substrate as the monolithic catalytic substrate is conveyed.

6. The system claim 1, further comprising a pressure assist system operatively positioned above the coating liquid applicator and adapted to apply an amount of downward force onto the monolithic catalytic substrate as the monolithic catalytic substrate contacts the coating liquid applicator.

7. The system claim 6, wherein the pressure assist system comprises one or more rollers positioned above the coating liquid applicator at a distance approximately equal to a height of the monolithic catalytic substrate.

8. A system for depositing a face coating on a monolithic catalytic substrate comprising:
   an in-feed system configured to convey the monolithic catalytic substrate to a coating liquid applicator for deposition of a face coating;
   an out-feed system configured to receive the monolithic catalytic substrate from a coating liquid applicator and convey the monolithic catalytic substrate away from the coating liquid applicator;
   at least one conveyor motor operatively associated with the in-feed system and/or out-feed system, which drives the in-feed system and out-feed system at a specified speed;
   a motor controller in electrical communication with the at least one conveyor motor that controls a specified feed speed produced by the at least one conveyor motor;
   a coating liquid applicator positioned between the in-feed system and out-feed system, wherein the coating liquid applicator comprises an inside core and an outside nap having a nap height, the coating liquid applicator being operatively positioned to deposit a face coating on and within a monolithic catalytic substrate contacted therewith such that the face coating penetrates into cells of the monolithic catalytic substrate with a maximum depth of penetration of about 1 mm to about 2.5 mm;
   a coating liquid trough positioned below the coating liquid applicator that is configured and dimensioned to receive the full length of the coating liquid applicator within the coating liquid trough and retain a coating liquid, and wherein the coating liquid trough is vertically positioned so that the nap of the coating liquid applicator is at least partially submerged within the coating liquid, a light source positioned to produce a light beam that follows a light path across the coating liquid applicator, the light path positioned at a predetermined height below the height of the nap of the coating liquid applicator such that the coating liquid applicator blocks the light beam when the nap of the coating liquid applicator is at a first height; and a light sensor positioned to receive the light beam from the light source when the light beam is unblocked by the coating liquid applicator, the light beam becoming unblocked when the height of the nap is reduced below the first height by a predetermined amount.

9. The system of claim 8, wherein a light beam received by the light sensor is configured to generate an alert that the nap of the coating liquid applicator is no longer of sufficient height to provide an intended amount of coating liquid to a monolithic catalytic substrate.

10. The system of claim 9, which further comprises:

a height-adjustment system operatively associated with the coating liquid applicator, which provides vertical positioning control, so the coating liquid applicator can be positioned a predetermined height above the horizontal plane of the in-feed and out-feed systems; and a computer in electronic communication with the height-adjustment system and the light sensor, wherein the computer is configured to receive electronic signals from the light sensor indicating the height of the coating liquid applicator above the horizontal plane of the in-feed and out-feed systems, and to send electronic signals to the height-adjustment system to change the vertical positioning of the coating liquid applicator.

11. A method of coating a monolithic catalytic substrate comprising:

providing the system of claim 8;

applying a substrate coating liquid to the coating liquid applicator;

supporting the monolithic catalytic substrate on the in-feed system such that the conveyor motor imparts a direction of motion at a predetermined speed to the monolithic catalytic substrate;

passing the monolithic catalytic substrate across the coating liquid applicator at the predetermined speed, so an amount of coating liquid is transferred from the coating liquid applicator to a face of the monolithic catalytic substrate that comes in contact with the coating liquid applicator; and detecting whether the light beam is blocked by the coating liquid applicator, and adjusting the height of the coating liquid applicator to an adjusted height in response to detection of the unblocked light beam.

12. The method of claim 11, which further comprises:

monitoring the quantity of coating liquid in the coating liquid trough with a coating liquid sensor;

determining if a quantity of coating liquid in the coating liquid trough is below an intended amount; and supplying additional coating liquid to the coating liquid trough to reestablish the intended quantity of coating liquid in the coating liquid trough.

13. The method of claim 11, which further comprises:

receiving the monolithic catalytic substrate on the out-feed system after it has passed across the coating liquid applicator.

14. The method of claim 11, which further comprises:

adjusting the pressure between the coating liquid applicator and the monolithic catalytic substrate, so that a predetermined amount of coating liquid is transferred from the coating liquid applicator to the monolithic catalytic substrate.

15. The method of claim 14, wherein the pressure applied between the coating liquid applicator and the monolithic catalytic substrate is adjusted by applying a pressure to a face of the monolithic catalytic substrate opposite the face in contact with the coating liquid applicator.

16. The method of claim 11, which further comprises:

monitoring the height of the coating liquid applicator above a horizontal plane of the in-feed system;

determining if the coating liquid applicator is not above the horizontal plane of the in-feed system; and adjusting the height of the coating liquid applicator to be at an intended height.

17. The method of claim 16, which further comprises:

increasing the amount of coating liquid in the coating liquid trough sufficient to compensate for the adjusted height of the coating liquid applicator.

* * * * *

UNITED STATES PATENT AND TRADEMARK OFFICE
CERTIFICATE OF CORRECTION

PATENT NO. : 9,833,810 B2
APPLICATION NO. : 14/341228
DATED : December 5, 2017
INVENTOR(S) : Gary A. Gramiccioni et al.

Page 1 of 1

It is certified that error appears in the above-identified patent and that said Letters Patent is hereby corrected as shown below:

In the Claims

In Column 18, Line 26, Claim 5, before "claim 1," insert --of--.

In Column 18, Line 31, Claim 6, before "claim 1," insert --of--.

In Column 18, Line 37, Claim 7, before "claim 1," insert --of--.

Signed and Sealed this
Twenty-seventh Day of March, 2018

Andrei Iancu
*Director of the United States Patent and Trademark Office*